United States Patent [19]
Arizpe-Gilmore

[11] Patent Number: 5,688,024
[45] Date of Patent: Nov. 18, 1997

[54] FOLDABLE ROTARY HUNTING SEAT

[76] Inventor: Roberto Arizpe-Gilmore, Av. San Angel 138, Col. Valle de San Angel Sector, Jardines Garza García N.L., Mexico, 66290

[21] Appl. No.: 649,943

[22] Filed: May 14, 1996

Related U.S. Application Data

[63] Continuation of Ser. No. 204,545, Mar. 2, 1994, abandoned.

[51] Int. Cl.⁶ ................................................ A47C 31/00
[52] U.S. Cl. .................................. 297/217.1; 297/440.1; 297/344.26; 297/378.1
[58] Field of Search ........................ 297/440.1, 217.1, 297/344.26, 17, 378.1; 42/94

[56] References Cited

U.S. PATENT DOCUMENTS

| | | | |
|---|---|---|---|
| 1,397,675 | 11/1921 | Buske | 297/378.1 |
| 2,546,439 | 3/1951 | Green | 108/156 |
| 2,703,137 | 3/1955 | Bierman | 297/378.1 X |
| 3,608,225 | 9/1971 | Manuel | 42/94 |
| 3,623,766 | 11/1971 | Funk | 297/217.1 X |
| 4,011,821 | 3/1977 | Neal | 108/156 |
| 4,544,202 | 10/1985 | Keaton | 297/344.26 X |
| 4,886,229 | 12/1989 | Arizpe-Gilmore | 248/125 |
| 5,096,186 | 3/1992 | Wilkinson et al. | 248/188 X |
| 5,149,900 | 9/1992 | Buck | 42/94 |
| 5,318,339 | 6/1994 | Cherniak | 297/344.26 |
| 5,364,163 | 11/1994 | Hardison | 297/344.26 X |
| 5,481,817 | 1/1996 | Parker | 42/94 X |

FOREIGN PATENT DOCUMENTS

| | | | |
|---|---|---|---|
| 1309316 | 10/1963 | France | 297/440.1 |
| 277939 | 9/1951 | Switzerland | 297/17 |
| 696317 | 8/1953 | United Kingdom | 297/378.1 |

Primary Examiner—Peter M. Cuomo
Assistant Examiner—David E. Allred
Attorney, Agent, or Firm—Abelman, Frayne & Schwab

[57] ABSTRACT

A foldable rotary hunting seat, comprising a seat and a seat back articulately coupled to the seat so as to allow to be folded when folding the seat; said seat and seat back being made of a rigid material; a plate bearing centrally coupled to a lower surface of the seat; four leg sockets, equally coupled to a lower surface of the plate bearing and four legs, each loosely coupled to a leg socket, so that the seat can rotate on said plate bearing when it is assembled and placed in a hunting position; a weapon support arm articulately coupled to the seat, to maintain the weapon support arm in a hunting position and allow to be folded when folding the seat; and a variable height weapon retaining fork rotary coupled to the upper vertical end of the support arm.

3 Claims, 3 Drawing Sheets

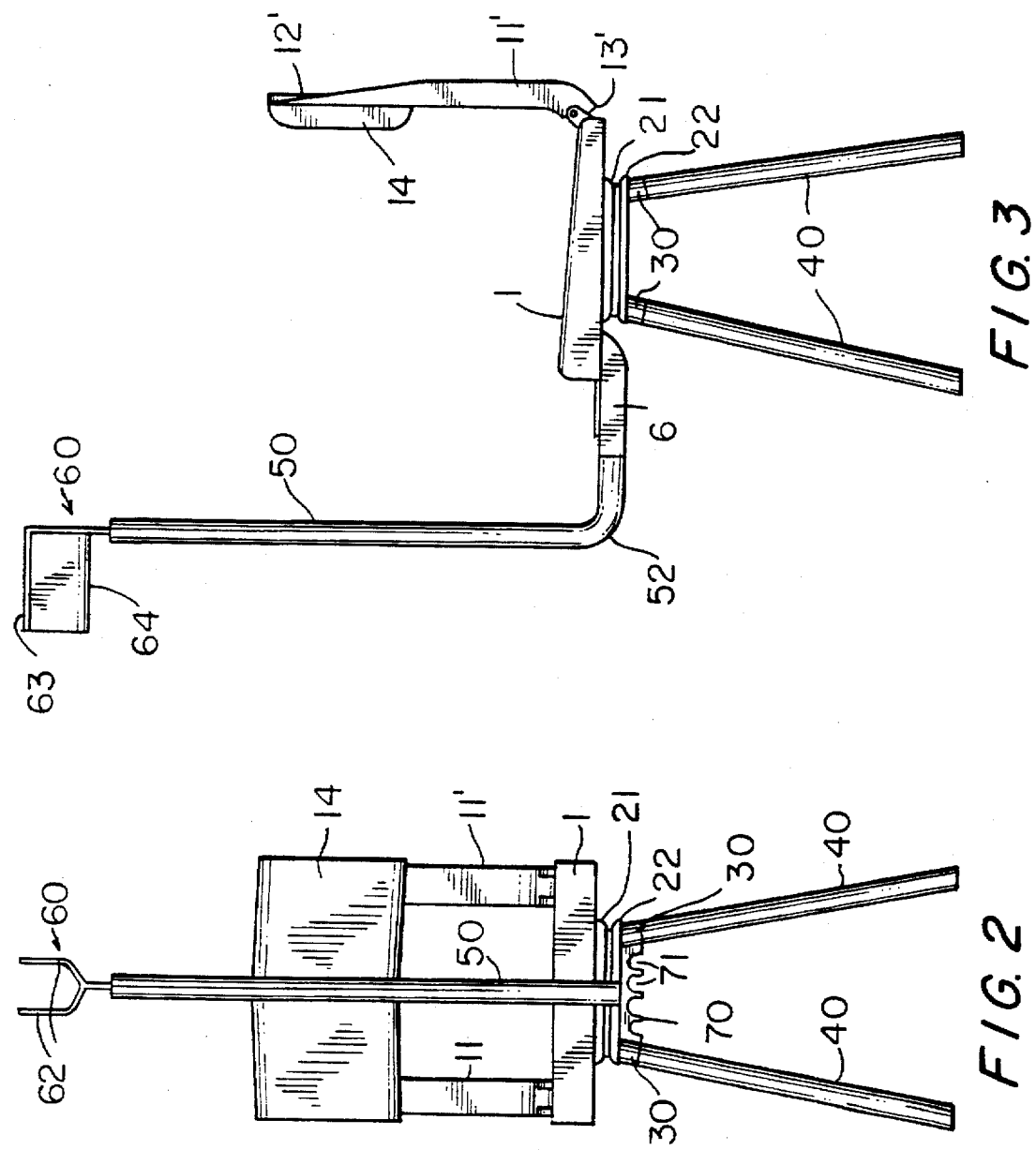

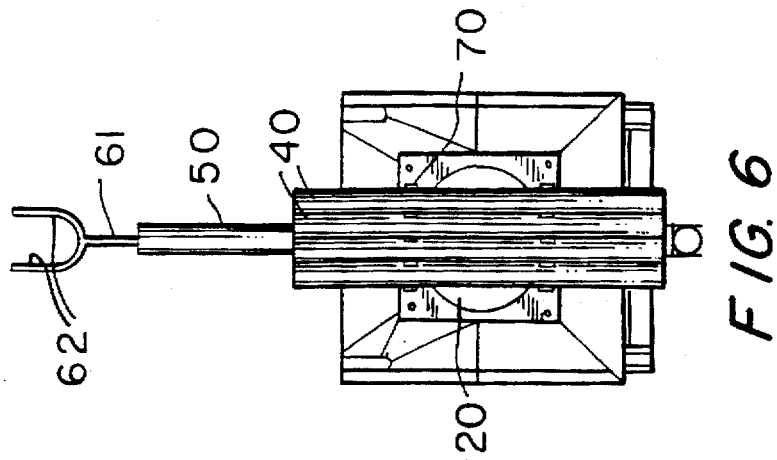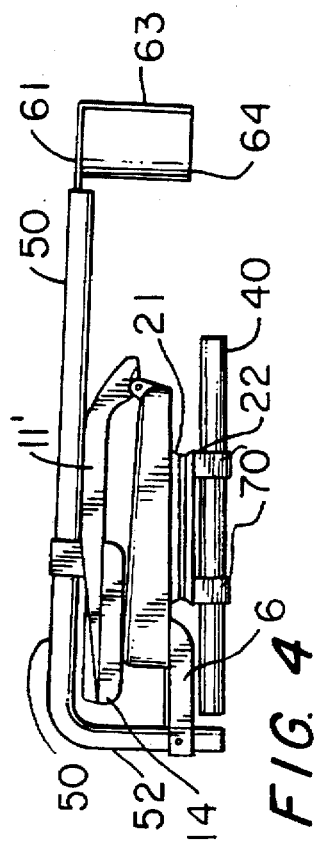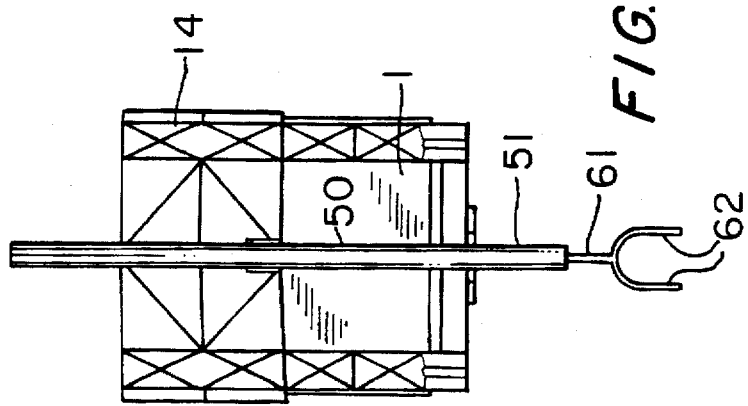

5,688,024

FOLDABLE ROTARY HUNTING SEAT

This is a continuation application under 37 C.F.R. 1.62 of prior application Ser. No. 08/204,545, filed on Mar. 2, 1994, now abandoned.

BACKGROUND OF THE INVENTION

A. Field of the Invention

This invention is related to a foldable rotary hunting seat to support and/or hold a weapon, and more specifically, to a foldable rotary hunting seat that allows the hunter to rotate on the seat and maintain the weapon support arm in a hunting position and allow to be folded when folding the seat.

B. Description of the Previous Art

Applicant's U.S. Pat. No. 4,886,229 discloses a "scissor" type foldable hunting seat comprising a seat and a support arm having variable height weapon retaining means, to support and/or hold the weapon, articulately coupled to said seat, which is adapted to support and/or hold the weapon at an adjustable height without the need of a hunter to grasp it and allows to rotate the weapon. Said foldable hunting seat includes a foldable fastening linkage for the support arm, comprising a pair of rods articulately coupled to each other and secured to the hunting seat and to the support arm, each having a lock recess and stops to allow a steady retention of said support arm when it is in an assembled position and be folded when folding the hunting seat.

This fastening linkage, however resulted in an increasing production cost of the hunting seat because of the separate manufacture of rods and machining of lock recesses and stops, as well as its incorporation in the hunting seat.

It was therefore highly desirable to provide a simplified arrangement by which said weapon support arm could be articulately fastened to the hunting seat to be placed in a hunting position and folded when folding the seat.

To overcome those disadvantages and with the above needs in mind, applicant invented a simplified arrangement as claimed in Applicant's U.S. patent application Ser. No. 08/010,288, to maintain the weapon support arm of the hunting seat in an assembled position and allow it to be folded when folding the seat, by including at least a stop pin in at least one of the vertical legs of the hunting seat, and providing the support arm with a "U" shaped lower end presenting two branches articulately fastened to the vertical legs of the tubular members of the seat and a horizontal connecting member which rests in the stop pin of the vertical leg to maintain the weapon support arm in a hunting position and allows it to be folded when folding the seat.

However, although all of these inventions provide means to allow the hunter to hold the weapon in the variable height weapon retaining fork, they are directed to steady "scissor" type seats which do nor allow the hunter to rotate on the seat.

Therefore, to provide the hunter the possibility of rotating on the seat when stalking game, in a more comfortable position, applicant has now invented a new foldable rotary hunting seat having a seat back and an arrangement to allow the hunter to rotate when seated on the hunting seat, besides the possibility of rotating the weapon on the retaining fork.

Said foldable rotary hunting seat comprises a seat and a seat back articulately coupled to the seat so as to allow it to be folded when folding the seat; a plate bearing centrally coupled by its upper surface to a lower surface of the seat; legs coupled to the plate bearing, so that the seat can rotate on said plate bearing when it is assembled and placed in a hunting position; a weapon support arm articulately coupled to the seat, to maintain the weapon support arm in a hunting position and allow it to be folded when folding the seat; and a variable height weapon retaining fork rotationally coupled to the upper vertical end of the support arm.

SUMMARY OF THE INVENTION

It is therefore a main object of the present invention, to provide a foldable rotary hunting seat having a seat and a seat back, adapted to allow the hunter to rotate when seated on the hunting seat, besides the possibility of rotating the weapon on the retaining fork while the hunter is waiting for the game.

It is still another main object of the present invention to provide a foldable rotary hunting seat including a simplified arrangement to articulately fasten the seat back and the weapon support arm to the hunting seat when placed in a hunting position and folded when folding the seat.

It is still another main object of the present invention to provide a foldable hunting seat having a simplified arrangement to loosely retain the legs of the seat, to allow the hunter to rotate when seated on the hunting seat.

It is a further main object of the present invention to provide a foldable rotary hunting seat including a new arrangement of legs, loosely coupled to sockets in the rotary means, to allow the seat to rotate when the seat is in a hunting position.

These and other objects and advantages of the invention will be apparent to those skilled in the art from the description of a preferred embodiment provided in combination with the accompanying drawings.

BRIEF DESCRIPTION OF THE DRAWINGS

FIG. 2 is an elevation front view of the foldable rotary hunting seat of FIG. 1;

FIG. 3 is an elevation lateral view of the foldable rotary hunting seat of FIG. 1;

FIG. 4 is a lateral view of the foldable rotary hunting seat of FIG. 1 in a folded position;

FIG. 5 is an upper plan view of the foldable rotary hunting seat of FIG. 1 in a folded position; and FIG. 6 is a lower plan view of the foldable rotary hunting seat of FIG. 1 in a folded position.

DETAILED DESCRIPTION OF THE INVENTION

Figure 1:
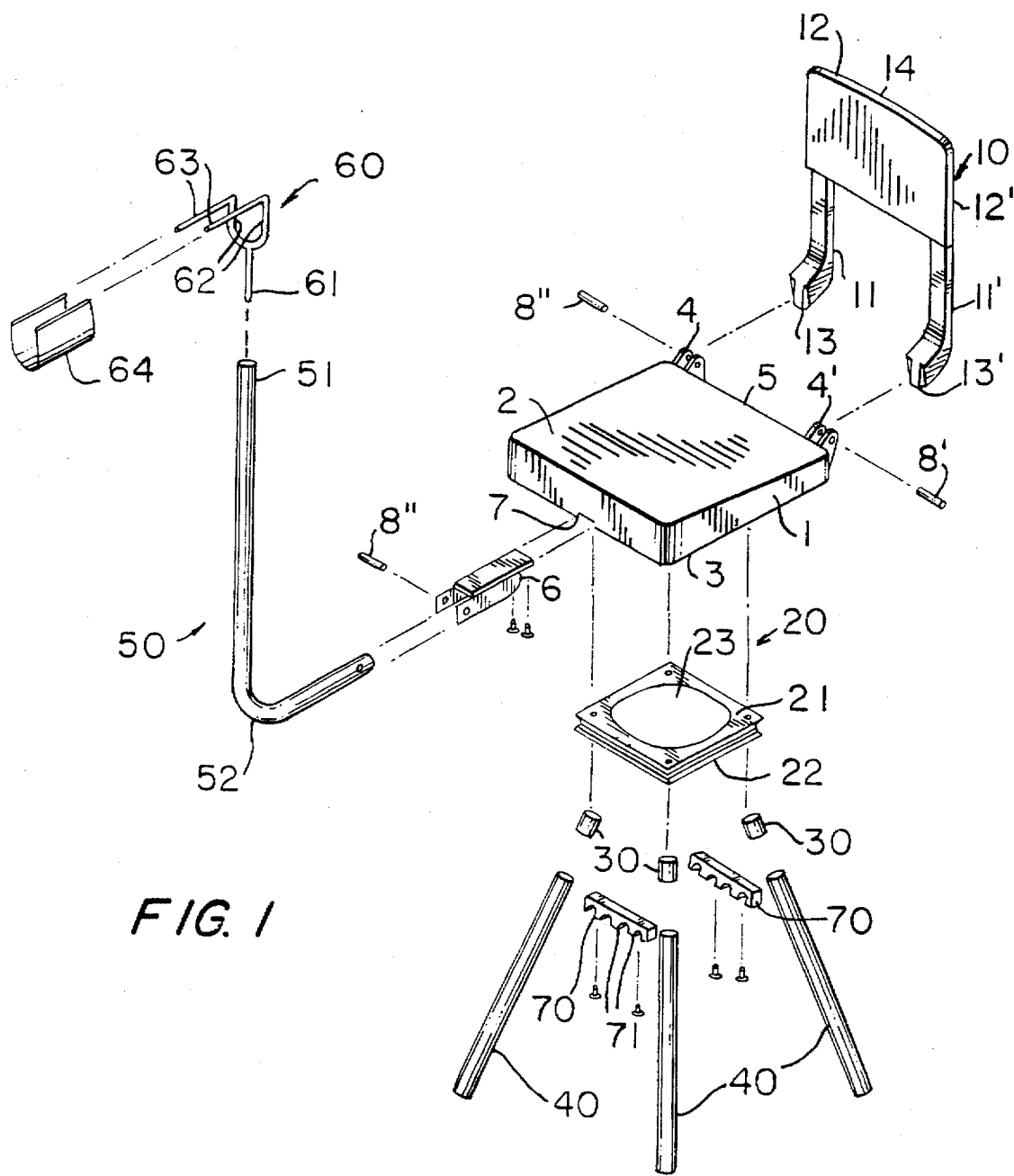
FIG. 1 is a conventional perspective and exploded view of the foldable hunting seat of the present invention, showing its separated constitutive parts in a hunting position.

The invention will now be described with reference to the accompanying drawings, wherein same numerals describe same features of the invention. The foldable rotary hunting seat of the present invention, comprising:

a seat 1 having an upper surface 2 and a lower surface 3, two metallic hinges 4,4' coupled to the rear edge 5 of the seat 1 and a metallic hinge 6 centrally coupled at the bottom front edge 7 of the seat 1, said hinges 4, 4' and 6 having perforations for articulately receiving a holding pin 8, 8' and 8";

a seat back 10 normally comprising two vertical members 11, 11' each having an upper end 12, 12' and a lower end 13 and 13' and a perforation, in its lower end 13, 13' to be articulately coupled to one of the metallic hinges 4, 4' of the seat 1 by the pin 8, 8', and a back plate 14 coupled at the upper ends 12, 12' of said vertical members 11, 11' so as to allow it to be folded when folding the seat;

the seat 1 and seat back 10 being made of a relatively rigid and light material such as plastic;

a rotary plate bearing 20 comprising upper and lower overlapped square plates 21 and 22 and a bearing 23 centrally held therebetween, said plate bearing 20 being coupled by its upper plate 21 to the lower surface 3 of the seat 1 by means of screws;

four leg sockets 30, each coupled to a corner of the lower plate 22 of the plate bearing 20;

four tubular legs 40, each loosely coupled to a leg socket 30;

an "L" shaped weapon support arm 50 having a threaded upper vertical end 51 and bent at its lower end 52 having a perforation to be articulately coupled to the hinge 6 centrally coupled at the bottom front edge 7 of the seat 1 by a fastening pin 8";

and a variable height weapon retaining fork 60 having its vertical lower end 61 rotary threaded to the upper end 51 of the support arm 50, and a pair of branched arms 62 each having a horizontal member 63 to retain a cot 64 made of a flexible and resistant material, grasped therebetween, so as to rotary retain and/or hold a weapon when the hunter is waiting for the game.

As illustrated in FIG. 6, a plastic carrier device 70 comprising four carrying channels 71, can be coupled at the lower plate 22 of the plate bearing 20 or at the rear surface of the seat back 10, to carry on the removable legs 40 by pressing them into the channels 71 of the carrier 70, when the hunting seat is in its folded position.

A carrier belt (not illustrated) can be coupled in any desired and proper position of the seat, to allow the hunter to carry on said foldable rotary hunting seat. The legs arrangement, although have been described as comprising the four leg sockets and four legs loosely coupled to the leg sockets, it has to be understand that the number of sockets and legs can be conveniently varied, and furthermore can be of the type comprising a pair of inverted "U" shaped members (not illustrated) foldably coupled to the lower plate of the plate bearing. The only necessary condition of the legs is that they have to be coupled to the lower plate of the plate bearing so as to allow the seat to be rotated on said plate bearing. Additionally, although this foldable rotary hunting seat has been referred to as including a seat back, it is to be understood that it is not absolutely necessary but convenient to provide the hunter a more comfortable option.

Finally, it is to be understood that the shape and distribution of the constitutive parts of the hunting seat of the present invention are not limited only to those already disclosed in the above description and that the persons skilled in the art could now suggest modifications which will be considered within the true scope of this invention as claimed in the following claims.

What is claimed is:

1. A foldable rotary hunting seat, comprising:

a seat of a rigid material, having an upper surface, a lower surface, a front edge, a rear edge and lateral edges;

a metallic channel having a hinge end centrally coupled at a bottom of the front edge of the seat;

rotary means comprising upper and lower overlapped square plates and a bearing centrally held therebetween, the upper plate being centrally coupled to the lower surface of the seat;

legs removably coupled to the lower plate of the rotary means, allowing the seat to rotate when it is in an assembled position;

a seat back articulately coupled to the seat and foldable over the seat when the rotary hunting seat is in a folded position;

an "L" shaped weapon support arm said "L" shaped weapon support arm comprising a single rigid "L" shaped member, said "L" shaped weapon support arm being articulately coupled to the hinge end of the metallic channel of the seat, to maintain the weapon support arm in a hunting position, said weapon support arm being folded over the seat and the seat back when the rotary hunting seat is in a folded position;

a variable height weapon retaining fork coupled to an upper vertical end of the support arm; and a carrier device centrally coupled to the lower plate of the rotary means, said carrier device holding the legs when the legs are removed to fold the rotary hunting seat.

2. A foldable rotary hunting seat, as claimed in claim 1, wherein said weapon support arm upper vertical end comprises threads and said support arm is bent at its lower end having a perforation to be articulately coupled to a hinge of said hinge end centrally coupled at said bottom of said front edge.

3. A foldable rotary hunting seat, as claimed in claim 1, wherein said variable height weapon retaining fork has its vertical lower end rotary screwed in a top of said upper vertical end of the support arm, and a pair of branched arms each having a horizontal member to retain a cot of flexible and resistant material, grasped therebetween, so as to hold a weapon as well as to rotate it when game is stalked and hunted.

* * * * *